US008228526B2

(12) United States Patent
    Akimoto et al.

(10) Patent No.: US 8,228,526 B2
(45) Date of Patent: Jul. 24, 2012

(54) IMAGE PROCESSING APPARATUS

(75) Inventors: Masao Akimoto, Kunitachi (JP);
    Takeshi Nakajima, Hino (JP)

(73) Assignee: Konica Minolta Business Technologies, Inc. (JP)

( * ) Notice: Subject to any disclaimer, the term of this patent is extended or adjusted under 35 U.S.C. 154(b) by 60 days.

(21) Appl. No.: 12/841,955

(22) Filed: Jul. 22, 2010

(65) Prior Publication Data

US 2011/0032565 A1    Feb. 10, 2011

(30) Foreign Application Priority Data

Aug. 6, 2009    (JP) .................................. 2009-183616

(51) Int. Cl.
    *G06K 15/00* (2006.01)
    *G03G 15/00* (2006.01)
(52) U.S. Cl. ...... 358/1.14; 358/1.9; 358/1.13; 358/1.15; 399/80; 399/87
(58) Field of Classification Search .................. 358/1.1, 358/1.13, 1.14, 1.15, 1.16; 399/8, 10, 11, 399/16, 79, 80, 81, 82, 87
    See application file for complete search history.

(56) References Cited

U.S. PATENT DOCUMENTS

| 6,184,966 | B1 * | 2/2001 | Fujita et al. ................... 349/152 |
| 6,184,996 | B1 * | 2/2001 | Gase ............................. 358/1.15 |
| 7,239,409 | B2 * | 7/2007 | Parry ........................... 358/1.15 |
| 7,284,061 | B2 * | 10/2007 | Matsubayashi et al. ....... 709/229 |
| 8,035,839 | B2 * | 10/2011 | Shaw ........................... 358/1.15 |
| 2003/0020953 | A1 * | 1/2003 | Van Den Tillaart et al. . 358/1.15 |
| 2004/0046986 | A1 * | 3/2004 | Kuwabara et al. ........... 358/1.14 |

FOREIGN PATENT DOCUMENTS

| JP | 2004-223990 | 8/2004 |
| JP | 2005-125661 | 5/2005 |
| JP | 2005-205741 | 8/2005 |
| JP | 2005-244656 | 9/2005 |
| JP | 2006-167966 | 6/2006 |
| JP | 2007-069534 | 3/2007 |

OTHER PUBLICATIONS

Notice of Reasons for Refusal issued by JPO on Mar. 17, 2011, 3 pgs.
Translation of Notice of Reasons for Refusal issued by JPO on Mar. 17, 2011, 3 pgs.

* cited by examiner

*Primary Examiner* — Twyler Haskins
*Assistant Examiner* — Dennis Dicker
(74) *Attorney, Agent, or Firm* — Squire Sanders (US) LLP

(57) ABSTRACT

Disclosed is an image processing apparatus, which makes it possible to put an implementation order of an outputting job, inputted by a user and currently in the standby state, forward, even if the concerned user does not conduct specific operations. The apparatus includes: a job inputting section to input an outputting job, while correlating it with user identification information; a job implementation order controlling section to control an implementation order of outputting jobs, based on priority degrees of the outputting jobs; a job implementing section to implement the outputting jobs according to the implementation order of them; a user-identification information inputting section; and a control section to conduct an updating operation for heightening a priority degree of a specific outputting job currently in the standby state, based on an inputting status of the user identification information inputted from the user-identification information inputting section and correlated with the specific outputting job.

18 Claims, 8 Drawing Sheets

| FIG.3A | FIG.3B |

| FIG.4A | FIG.4B |

IMAGE PROCESSING APPARATUS

This application is based on Japanese Patent Application NO. 2009-183616 filed on Aug. 6, 2009, with the Japan Patent Office, the entire content of which is hereby incorporated by reference.

BACKGROUND OF THE INVENTION

The present invention relates to an image processing apparatus that controls an implementation order of output jobs for outputting images.

Among the image processing apparatuses that implement print jobs or the like, inputted by the user, a certain image processing apparatus is so constituted that it establishes priority degrees of the inputted print jobs, based on a kind of job, a time required for processing, an authority owned by the user, a state of job currently in mid course of its implementation or its standby status, etc., with respect to each of the inputted print jobs, and then, it determines the implementation order of the inputted print jobs to be exclusively controlled from each other, based on the priority degrees above-established, so as to sequentially implement them one by one based on the implementation order of them above-determined. In such the case that the priority degrees are to be established as abovementioned, there has been a possibility that it would take a considerable time to start an implementation of a job whose priority degree is made to be low, when another job having a high priority degree is inputted after that, since the implementation of the other job overrides that of the job concerned.

With respect to the technology for automatically changing the priority degrees or the implementation order of the print jobs concerned, for instance, in order to eliminate such the case that the print job, having a low priority degree and currently in mid course of waiting its implementation (standby print job), is hardly implemented for a long time, due to frequent interruptions of the other jobs having high priority degrees, Tokkai 2005-125661 (Japanese Patent Application Laid-Open Publication) sets forth such the technology that the times of interruptions, incurred by the print job having the low priority degree, are counted, to heighten the priority degree of the print job, having the low priority degree, on the basis of the number of the interruption times, so as to change its implementation order to that sooner than ever.

Further, with respect to the mail box printing operation (security printing) in which, after the user designates a mail box settled in advance in the HDD (Hard Disc Drive) provided in the MFP (Multi Function Peripheral) and transmits print data to the designated mail box of the MFP from the client PC (Personal Computer), the user operates the panel provided in the MFP side so as to instruct the printing operation based on the print data stored in the mail box concerned, Tokkai 2005-244656 (Japanese Patent Application Laid-Open Publication) sets forth the other technology for automatically changing the implementation order of the print jobs, based on the priority degrees. According to the technology set forth in Tokkai 2005-244656, during the time interval from the time when the user has inputted various kinds of information, such as a mail box ID (IDentification), a password, etc., through the operation panel, to the other time when the printed product concerned is outputted, the operation for authenticating the concerned user by employing a near-distance wireless communication technology is conducted, and at the same time, the operation for authenticating the other user whose priority degree is higher than that of the concerned user who has inputted the print job currently implemented, is also conducted, in order to shorten the time for waiting in front of the MFP. Then, if the print data of the other user exists in the mail box, the print job currently implemented is suspended so as to preferentially implement the print job of the other user.

Still further, there has been generally well known, various kinds of functions, such as a job interrupting function, a jumping function, etc., for accelerating the implementation of the job, whose implementation order is set at a later position, through the user's operations. In the image processing apparatus provided with the abovementioned functions, for instance, when the user is made to wait due to the fact that the print job inputted by the user is not instantaneously implemented, the user would confirm the implementation order of the concerned print job by using the operational panel, etc. When confirming that the priority degree of the print job inputted by himself is set at a lower rank, but it is necessary to hurry the implementation of the concerned print job, the user himself can conduct the operations for applying the job interrupting function and/or the jumping function from the operational panel or the like, so as to preferentially process the print job of his own prior to the other print jobs.

However, according to the technology for heightening the priority degree of the print job currently in the standby state (hereinafter, referred to as the standby print job, for simplicity) corresponding to the number of interruption times as set forth in Tokkai 2005-125661, in the sate that a large number of standby print jobs having low priority degrees exist, when the number of interruption times in regard to each of the standby print jobs exceeds the predetermined number, all of the priority degrees of the large number of standby print jobs are heightened at a time, so as to preferentially and sequentially implement the standby print jobs one by one. As a result, there has been a possibility that it would take a considerable time to start an implementation of another print job inputted after that.

On the other hand, according to the technology set forth in Tokkai 2005-244656, the system is so constituted that the user visited to the MFP concerned is automatically authenticated, and then, the priority degree of the above-authenticated user is compared with that of the other user who has already inputted a print job, so as to determine whether the print job of the above-authenticated user or that of the other user should override the other. However, in such a case that a large number of print jobs, inputted by the users whose priority degrees are higher than that of the above-authenticated user, are in the standby status, there has been a possibility that it would take a considerable time to start an implementation of the print job inputted by the above-authenticated user having the low priority degree.

Still further, even when the priority degree of the job concerned can be changed by the user's operation, in such a case that the job of the concerned user is inputted with a low priority degree, and then, the other job, having a priority degree higher than that of the job of the concerned user, is inputted later, it has been inconvenient for such the concerned user, who has no authority for changing the priority degrees, to wait until the other job having a priority degree higher than that of his own is completed, while being incapable of changing the priority degree even in an emergency case.

Yet further, even when the image processing apparatus is provided with the job interrupting function or the like, in such a case that the priority degree of the job inputted by the user has been lowered, it has been inconvenient for such the user, who has not used to the operations of the image processing apparatus concerned and/or has not been familiar with the provided functions, to wait until the other job having a priority degree higher than that of his own is completed, while being incapable of using the job interrupting function or the like to change the priority degree even in an emergency case.

SUMMARY OF THE INVENTION

To overcome the abovementioned drawbacks in conventional image processing apparatus, it is one of objects of the present invention to provide an image processing apparatus, which makes it possible to put an implementation order of an image outputting job, inputted by the user and currently in the standby state for waiting its turn to be commenced, forward, even if the concerned user does not conduct specific operations.

Accordingly, at least one of the objects of the present invention can be attained by the image processing apparatuses described as follows.

(1) According to an image processing apparatus reflecting an aspect of the present invention, the image processing apparatus comprises: a job inputting section to input an outputting job based on which an image is to be outputted, therefrom, while correlating user identification information of a user, who instruct an operation for implementing the outputting job, and the outputting job with each other; a job implementation order controlling section to control an implementation order of outputting jobs, each of which is the outputting job inputted from the job inputting section, based on priority degrees of the outputting jobs; a job implementing section to sequentially implement the outputting jobs one by one, according to the implementation order of the outputting jobs; a user-identification information inputting section to input the user identification information, therefrom; and a control section to conduct an updating operation for heightening a priority degree of a specific outputting job, which is currently in a standby state for waiting its turn to be commenced by the job implementing section, based on an inputting status of the user identification information inputted from the user-identification information inputting section and correlated with the specific outputting job.

(2) According to another aspect of the present invention, in the image processing apparatus recited in item 1, the user-identification information inputting section includes a connecting section, which is coupled to a storage device into which the user identification information is stored, and through which the user identification information is inputted.

(3) According to still another aspect of the present invention, in the image processing apparatus recited in item 1, the user-identification information inputting section includes a receiving section, which communicates with a terminal device that transmits the user identification information, so that the user identification information is inputted through the receiving section.

(4) According to still another aspect of the present invention, in the image processing apparatus recited in item 1, the inputting status represents a number of times the user identification information have been inputted from the user-identification information inputting section.

(5) According to still another aspect of the present invention, in the image processing apparatus recited in item 4, when the number of times the user identification information have been inputted from the user-identification information inputting section exceeds a predetermined threshold value, the control section conducts the updating operation for heightening the priority degree of the specific outputting job, which is currently in the standby state for waiting its turn.

(6) According to still another aspect of the present invention, in the image processing apparatus recited in item 1, the inputting status represents a time period, during which the user identification information has been inputted at the user-identification information inputting section.

(7) According to still another aspect of the present invention, in the image processing apparatus recited in item 6, when the time period, during which the user identification information has been inputted at the user-identification information inputting section, exceeds a predetermined threshold value, the control section conducts the updating operation for heightening the priority degree of the specific outputting job, which is currently in the standby state for waiting its turn.

(8) According to still another aspect of the present invention, in the image processing apparatus recited in item 1, when completing the updating operation for heightening the priority degree of the specific outputting job, which is currently in the standby state for waiting its turn, the control section conducts an operation for notifying the user of a message indicating that the updating operation has been completed.

(9) According to still another aspect of the present invention, the image processing apparatus, recited in item 8, further comprises: a display section; wherein the control section makes the display section display the message thereon.

(10) According to still another aspect of the present invention, the image processing apparatus, recited in item 8, further comprises: a sound generating section; wherein the control section makes the sound generating section emit audible sound representing the message therefrom.

(11) According to yet another aspect of the present invention, the image processing apparatus, recited in item 1, further comprises: a communication section to communicate with a terminal device of the user who has inputted the outputting job; wherein the control section makes the communication section transmit the message to the terminal device.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENT

Figure 1:
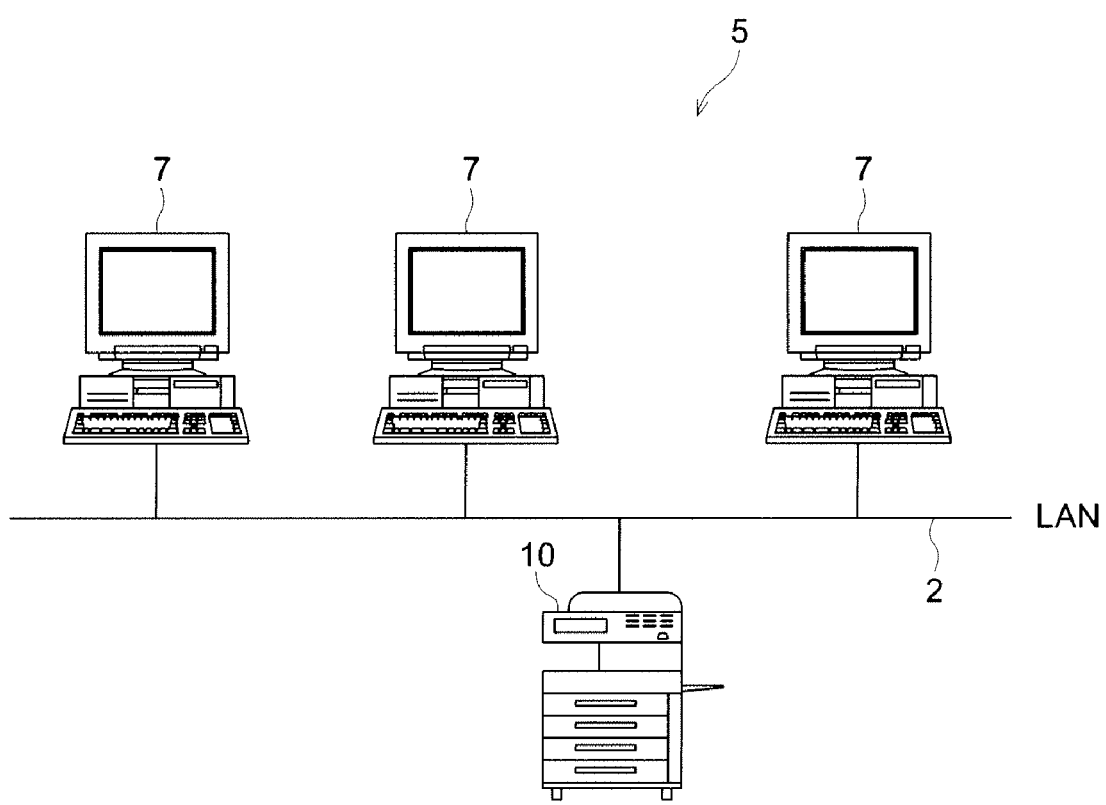
FIG. 1 shows a schematic diagram indicating an exemplified system configuration of an image processing system, embodied in the present invention as the first embodiment.

Referring to the drawings, embodiments of the present invention will be detailed in the following.

First Embodiment

FIG. 1 shows a schematic diagram indicating an exemplified system configuration of the image processing system 5, embodied in the present invention as the first embodiment. The image processing system 5 is constituted by an arbitral number of terminal devices 7, a MFP (Multi Function Peripheral) 10 that serves as an image processing apparatus embodied in the present invention as the first embodiment and a network 2, such as a LAN (Local Area Network), etc., through which the terminal devices 7 and the MFP 10 are coupled to each other. The terminal device 7 is constituted by a general purpose personal computer, etc.

The MFP 10 is provided with: a copy function for optically reading a document image and printing its reproduced image onto a recording medium so as to output the recording medium printed with the reproduced image; a scanning function for storing document image data, read from the document, as a file and/or transmitting the document image data to the terminal device 7, a server, etc.; a printer function for printing the reproduced image, represented by the image data received from the terminal device 7, or the other reproduced image, represented by the other image data filed in a file stored in the MFP 10 concerned, onto the recording paper sheet so as to output the recording paper printed with the reproduced image; a facsimile function for transmitting and receiving the image data to/from a facsimile apparatus and another MFP; an E-mail function for transmitting and receiving an E-mail to/from an external device; a user authenticating function for conducting a user authenticating operation (individual user authentication) by utilizing a token device (authenticating device) serving as a device for authenticating use; etc.

The user who is permitted to use the MFP 10 carries a token device in which authenticating information for authenticating the user concerned (user identification information) is stored. The MFP 10 is so constituted that the MFP 10 implements the user authenticating operation, after receiving the authenticating information inputted from the token device. However, in such a configuration that the terminal device 7 implements the user authenticating operation, after receiving the authenticating information inputted from the authenticating device, it is also applicable that the abovementioned token device is also serves as the authenticating device of the terminal device 7.

When the user intends to make the MFP 10 implement jobs, such as a copying operation of a document, a scanning operation, a facsimile transmitting operation, etc., or implement a print job filed in a stored file, it is possible for the user to make the MFP 10 implement the abovementioned various kinds of jobs by conducting the user authenticating operation on the MFP 10 and instructing the implementation of the jobs concerned, so as to input the abovementioned various kinds of jobs into the MFP 10. On the other hand, when the user intends to make the MFP 10 implement the print job by operating the terminal device 7, it is possible for the user to make the MFP 10 implement the print job by conducting the user authenticating operation on the terminal device 7, and conducting the operation for designating the file to be printed, the operation for setting the print job and the operation for instructing the implementation of print job concerned, so as to input the print job abovementioned into the MFP 10. The abovementioned jobs, such as the copying operation of the document, the scanning operation, the facsimile transmitting operation, etc., are categorized in an outputting job in which the MFP 10 outputs images.

The MFP 10 is further provided with: a priority degree setting function for establishing a priority degree of the outputting job inputted by the user; a priority degree changing function (interruption accepting function) for changing the priority degree of the outputting job inputted by the user, when receiving user's operations for changing the priority degree concerned; an implementation order determining function for determining the implementation order of a plurality of outputting jobs to be exclusively controlled from each other; an outputting job implementation function for controlling the plurality of outputting jobs on the basis of the implementation order above-determined, so as to sequentially implement the outputting jobs one by one according to the implementation order above-determined under the controlling operations thereof; and a priority degree heightening function for heightening a priority degree of a specific outputting job currently in the standby state, when determining that the urgency of the specific outputting job is high, based on the user's activities (action pattern) performed after the concerned user has inputted the specific outputting job.

The priority degree of the outputting job is raked at any one of plural ranks, such as two ranks of low and high, three ranks of low, middle and high, etc. The MFP 10 automatically establishes the priority degree (initial priority degree) of the outputting job inputted by the user, based on predetermined conditions.

In the present embodiment, based on the traveling actions performed by the user, the MFP 10 determines the urgency of the outputting job, the priority degree of which is set at a low rank and which is currently in the standby state. Hereinafter, the term of the "traveling action" is defined as such an action that the user travels the MFP 10 so as to confirm the current progress status (outputting status) of the outputting job, inputted by the user concerned. Further, the MFP 10 is so constituted that, when the MFP 10 has authenticated the user who inputted the outputting job, the priority degree of which is set at the low rank and which is currently in the standby state, during the time period from the time when the concerned job is inputted, to the other time when the concerned job is implemented, namely, when the authenticating information is inputted into the MFP 10 from the token device possessed by the user, the MFP 10 recognizes the traveling action performed by the user concerned. Then, if the number of traveling times (number of user authenticating times/number of times for inputting authenticating information) exceeds the predetermined value established in advance, the MFP 10 determines that the urgency of the outputting job concerned becomes high, and then, conducts operations for updating the priority degrees so as to heighten the priority degree of the outputting job, inputted by the user concerned.

Figure 2:
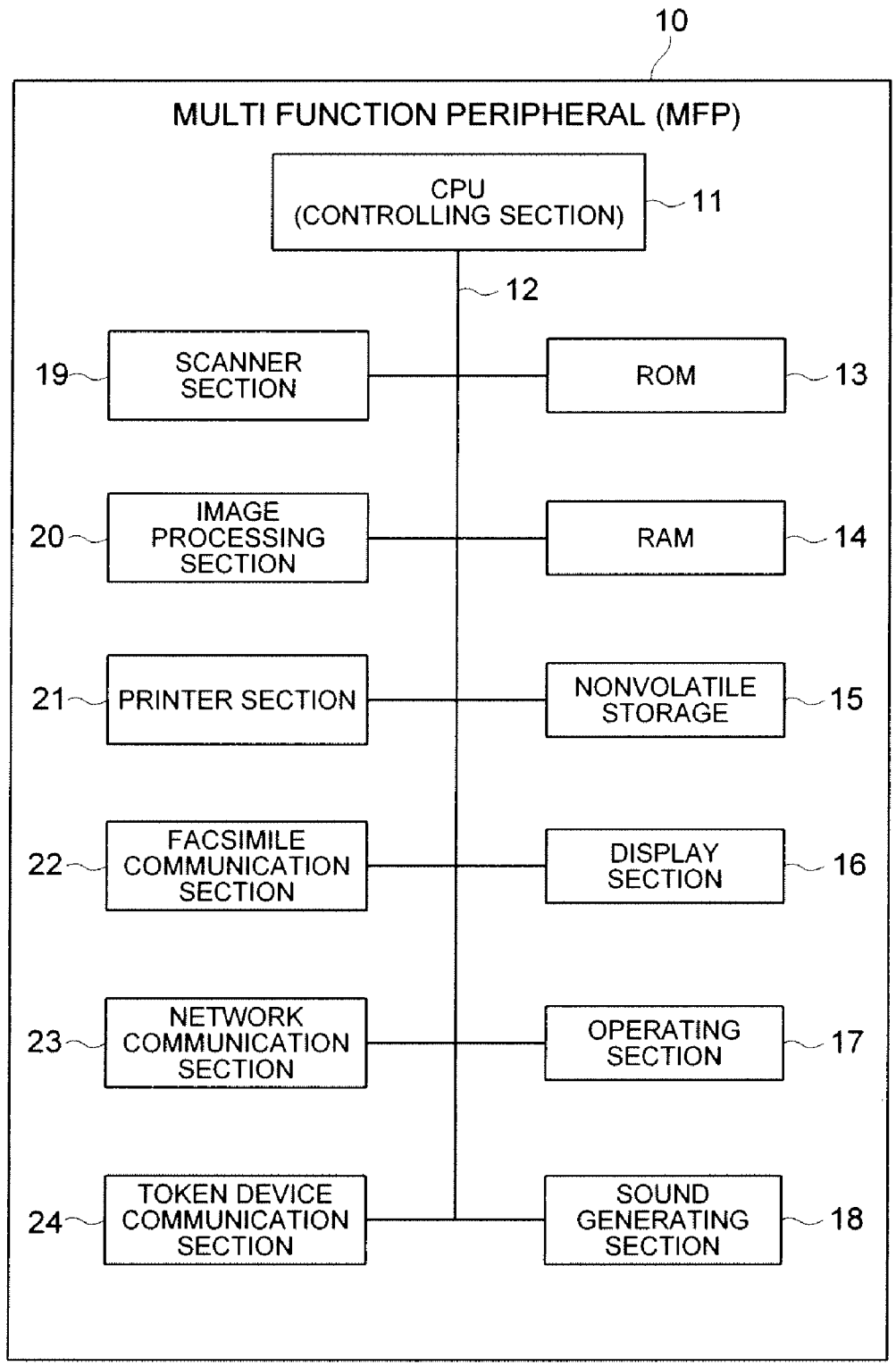
FIG. 2 shows a block diagram indicating a rough configuration of a Multi Function Peripheral, serving as an image processing apparatus embodied in the present invention as the first embodiment.

FIG. 2 shows a block diagram indicating a rough configuration of the MFP 10. The MFP 10 is constituted by a CPU (Central Processing Unit) 11 serving as a controlling section, a ROM (Read Only Memory) 13, a RAM (Random Access Memory) 14, a nonvolatile storage 15, a display section 16, an operating section 17, a sound generating section 18, a scanner section 19, an image processing section 20, a printer section 21, a facsimile communication section 22, a network communication section 23 and a token device communication section 24, which are coupled to each other through a bus 12.

Based on programs stored in the ROM 13, the CPU 11 totally controls various kinds of operations to be conducted in the MFP 10. The RAM 14 serves as not only a working memory into which various kinds of data are temporarily stored when the CPU 11 executes the programs, but also an image data storage for temporarily storing image data therein, or the like.

The nonvolatile storage 15, which is capable of retaining stored data even if its power source is turned OFF, stores information inherent to the apparatus concerned and various kinds of setting information, display data representing various kinds of screens to be displayed on the display section 16, authenticating information of the user, an E-mail address of the terminal device 7 used by the user, job information, etc., therein. The job information includes image data of the job, the priority degree of the job, a job traveling counter, etc.

For instance, the image data included in the job is such image data that is acquired by reading a document in a scanning operation, a copying operation, or to be transmitted via facsimile transmission; or such print data (image data) that is included in the print job received and instructed from the terminal device 7; etc. In this connection, it is also applicable that the above-cited image data is stored into an HDD (Hard Disc Drive) or the like equipped separately, instead of storing the image data into the nonvolatile storage 15.

The priority degree of the job serves as setting information to be utilized for determining the implementation order of the job concerned. As aforementioned, the priority degree of the job is such the information that represents any one of plural ranks, such as two ranks of low and high, three ranks of low, middle and high, etc., so that the MFP 10 automatically selects the initial priority degree from the plural ranks at the time when the concerned job is inputted, based on the predetermined conditions. The predetermined conditions include a kind of job, a processing time, a user's authority, a status of job currently in mid course of its implementation or standby state, etc.

The job traveling counter serves as such a counter that counts number of times the user has traveled the MFP 10, when the job, which has been in mid course of the standby state since it was inputted by the user concerned, exists. In the present embodiment, the job traveling counter is provided in a unit of job. However, it is also applicable that the traveling counter is provided in a unit of user. For instance, when plural jobs has been in mid course of the standby state since a single user inputted the plural jobs, an individual job traveling counter is provided for every job if the job traveling counter should be provided in a unit of job, while a job traveling counter being common for the plural jobs is provided for every user if the job traveling counter should be provided in a unit of user.

The job (outputting job) to be inputted by the user is inputted while being correlated with the user concerned (authenticating information of the user), so as to control the inputted job and its job information, such as the image data, the priority degree, the job traveling counter, etc., while correlating them with the user who inputted the job concerned.

The display section 16 is constituted by a LCD (Liquid Crystal Display), etc., so as to display various kinds of screens, such as an operating screen, a setting screen, a confirmation screen, a notification screen, etc., thereon. The operating section 17 is constituted by various kinds of buttons and keys, such as a start key, a stop key, a ten key, etc., a touch panel mounted onto the front surface of the LCD to detect a coordinate position of a point depressed by the user, etc., so as to accept the various kinds of operations to be conducted for the MFP 10 by the user. The sound generating section 18 generates various kinds of sounds, such as a beeping sound, etc.

The scanner section 19 acquires image data by optically reading a document. For instance, the scanner section 19 is constituted by: a light source to irradiate light onto the document; a line image sensor to receive the light reflected from the document so as to read the document for one scanning line in its width direction; a document moving mechanism to sequentially move the document reading position in a unit of one scanning line toward a longitudinal direction of the document one by one; an optical path including optical elements, such as a lens, a mirror, etc., to guide the light reflected from the document toward the line image sensor so as to focus the light onto the line image sensor; a converting section to convert the analogue image signals outputted by the line image sensor to digital image data; etc.

The image processing section 20 not only applies the rasterize processing to the print data (written in the vector format) received from the terminal device 7, but also applies various kinds of image processing, such as an image correction processing, an image rotation processing, an image-size enlargement/reduction processing, an image-data compression/expansion processing, etc., to the image data.

The printer section 21 forms an image, represented by the image data, onto the recording paper sheet through the electro-photographic process, so as to output the recording paper sheet recorded with the reproduced image. For instance, the printer section 21 is configured as a so-called laser printer that is constituted by: a conveyance mechanism to convey the recording paper sheet; a photoreceptor drum; a charging device; a LD (Laser Diode) to emit laser beam modulated according to the inputted image data in the ON-OFF switching mode; a laser-beam scanning unit to scan the modulated laser beam, emitted by the LD, onto the circumferential surface of the photoreceptor drum; a developing device; a transferring and separation device; a cleaning device; and a fixing device. In this connection, other than the abovementioned laser printer, any other printer, including a LED (Light Emitting Diode) printer in which lights emitted from a plurality of LED elements are irradiated onto the photoreceptor drum instead of the laser beam, could be also employed as the printer section 21 of the present embodiment.

The facsimile communication section 22 transmits and receives image data to/from an external apparatus provided with a facsimile function through a public communication line. On the other hand, the network communication section 23 communicates with the external apparatus through the network 2.

The token device communication section 24 communicates with the user's portable token device for authenticating use, so as to acquire the authenticating information (user identification information) stored in the token device concerned.

Either the contact type token device or the non-contact type token device is applicable in the present embodiment. When the contact type token device is employed, the token device concerned can be constituted by a magnetic card, etc. When the non-contact type token device is employed, the token device concerned can be constituted by either an IC (Integrated Circuit) card, or a wireless device employing any one of the various kinds of near-distance wireless communication technologies, such as the RFID (Radio Frequency IDentification), the Bluetooth, the ZigBee, etc. In the case of wireless communication, when the user approaches the MFP 10 to such an extent that the communication between the user's portable token device and the MFP 10 becomes possible (enters into the communication enabling area), the token device communication section 24 automatically starts the communication with the user's portable token device (wireless communication device), so as to acquire the user's authenticating information stored in the user's portable token device.

Next, the operations of the MFP 10 will be detailed in the following.

Referring to the activity chart of the UML (Unified Modeling Language) 2.0, which makes it possible to represent parallel processing in a two-dimensional chart, the operations of the MFP 10 will be detailed in the following.

Figures 3, 3A:
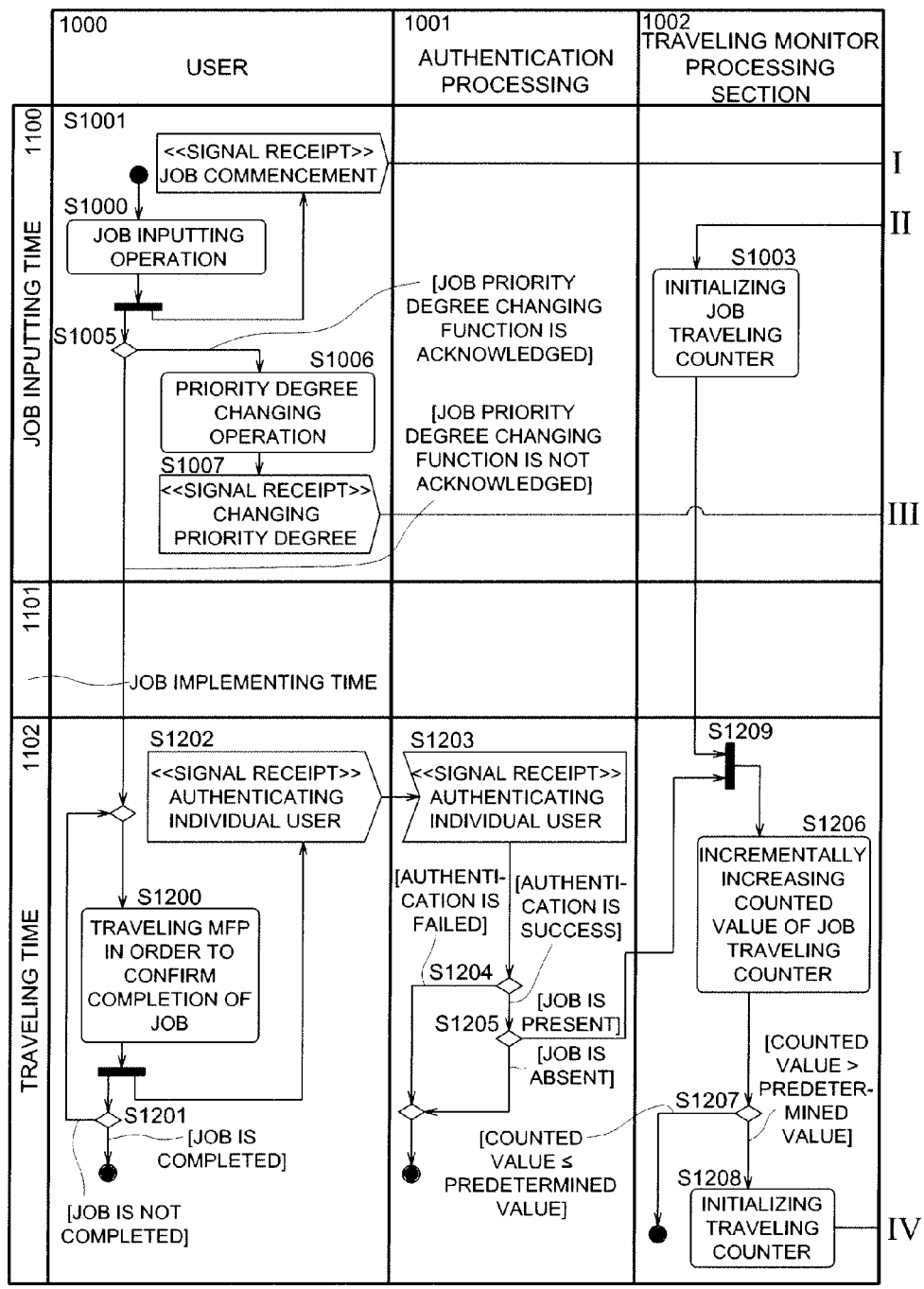
FIG. 3 shows an activity chart indicating operations to be conducted in a Multi Function Peripheral, serving as an image processing apparatus embodied in the present invention as the first embodiment.
Figure 3B:
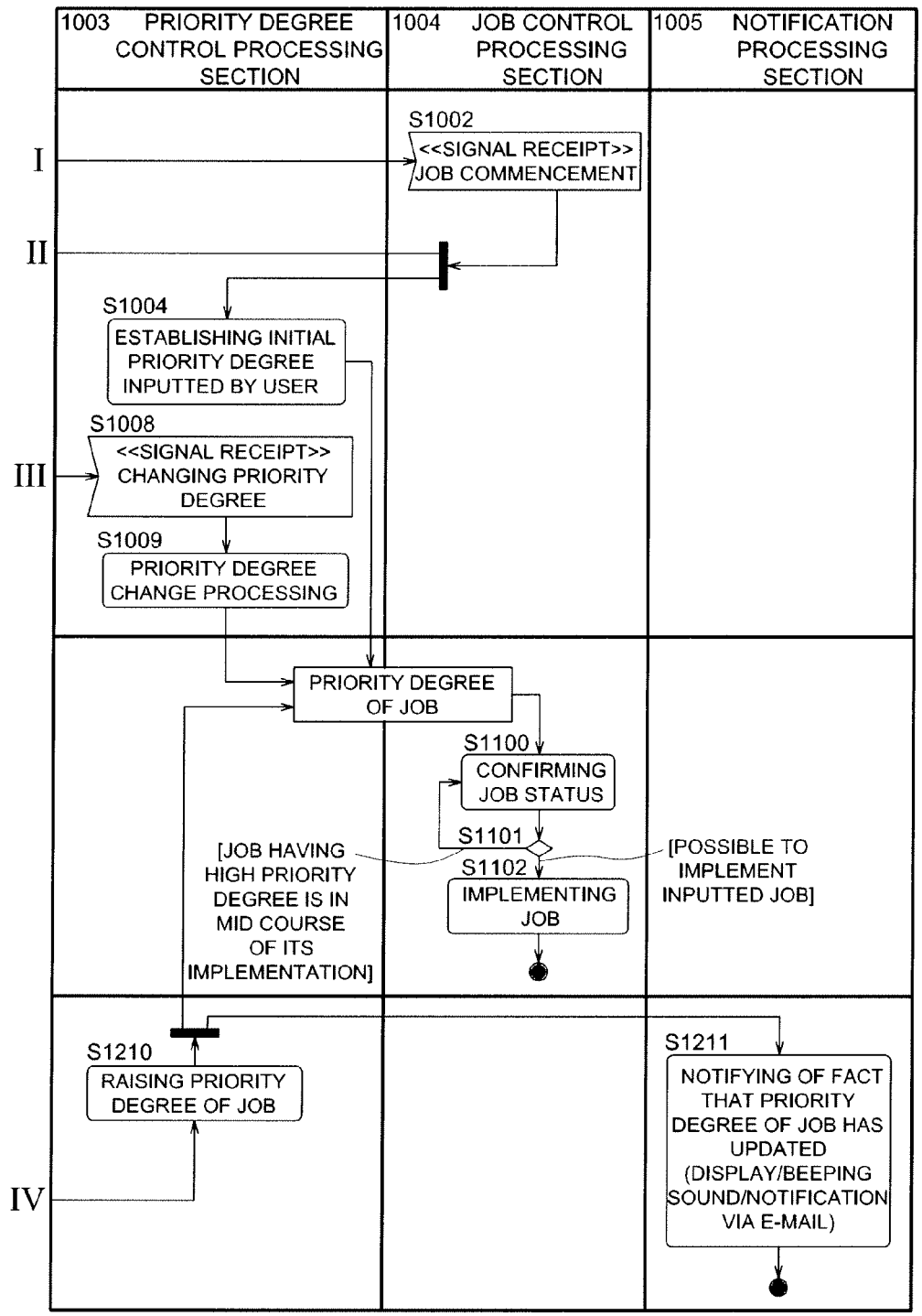

FIG. 3 shows an activity chart indicating the operations to be conducted in the MFP 10 embodied in the present invention as the first embodiment. As shown in FIG. 3, the contents of the processing to be conducted in each of the processing sections by either the user or the controlling section (CPU 11) of the MFP 10 are indicated in each of the vertical lanes, extended in a direction of the vertical axis and divided in a direction of the horizontal axis. The processing items in a vertical lane 1000 represent the operations to be conducted by the user, the processing items in a vertical lane 1001 represent the authenticate processing to be conducted by the MFP 10, the processing items in a vertical lane 1002 represent the user's traveling monitor processing to be conducted by the MFP 10, the processing items in a vertical lane 1003 represent the priority degree control processing to be conducted by the MFP 10, the processing items in a vertical lane 1004 represent the job control processing to be conducted by the MFP 10, and the processing items in a vertical lane 1005 represent the contents of notification processing to be conducted by the MFP 10. Each of the statuses of the user and the MFP 10, associating with the passage of time, is represented in each of the horizontal lanes, extended in a direction of the horizontal axis and divided in a direction of the vertical axis. The processing items in a horizontal lane 1100 represent the processing (operations) to be conducted at the time of initially inputting the job, the processing items in a horizontal lane 1101 represent the processing (operations) to be conducted at the time of implementing the job, and the processing items in a horizontal lane 1102 represent the processing (operations) to be conducted at the time when the user travels the MFP 10.

Hereinafter, described is such an exemplified embodiment that the MFP 10 is provided with the job priority degree changing function (interruption function) to be operated by the user, the user's portable token device for authenticating the user concerned is the non-contact type token device and authority is attached to each of the users. Further, hereinafter, in the descriptions for explaining each of processing to be conducted by the MFP 10, indicated in each of the vertical lanes, the reference number of corresponding lane is also used as the reference number of each of processing sections that implements the processing concerned, for descriptive purpose.

Operations to be Conducted at the Time of Initially Inputting the Job (Horizontal Lane 1100)

The user 1000 inputs instructions for conducting a file printing from the terminal device 7. Alternatively, the user sets a document onto the scanner section 19 of the MFP 10 and inputs an instruction for conducting the copy operation from the operating section 17, so as to conduct the operation for inputting the output job (Step S1000). Although the user has completed the user authenticating process at the MFP 10 or the terminal device 7 before conducting the job inputting operation, the user authenticating process to be conducted before initially inputting the job concerned is not shown in the drawings (omitted from the drawing). In the user authenticating process to be conducted in the MFP 10, the token device communication section 24 compares the authenticating information, acquired from the user's portable token device, with the other authenticating information, stored in the nonvolatile storage 15 for checking use, so as to identify the user concerned and to achieve the authenticating operation.

In response to the job inputting operations, either the network communication section 23 of the MFP 10, or a job control processing section 1004 through the operating section 17 is notified of the event of the job commencement (Step S1001, Step S1002).

The job control processing section 1004 registers the inputted job into the job queue, while correlating it with the user (user's authenticating information), in order to control the inputted job concerned. When the printing instruction is sent from the terminal device 7, the job control processing section 1004 is notified of the authenticating information, authenticated by the terminal device 7, from the terminal device 7, so as to register and control the inputted job while correlating it with the user's authenticating information. When the copy instruction or the like is inputted from the MFP 10, the job control processing section 1004 registers and controls the inputted job while correlating it with the user's authenticating information authenticated by the MFP 10. Further, the job control processing section 1004 issues a processing instruction to a traveling monitor processing section 1002 and a priority degree control processing section 1003.

Receiving the processing instruction sent from the job control processing section 1004, the traveling monitor processing section 1002 initializes the traveling counter of the job registered (Step S1003), and waits for the user to travel the MFP 10 (Step S1209). When receiving the printing information sent from the terminal device 7, the traveling monitor processing section 1002 waits for the user to travel the MFP 10. When the copy instruction or the like is inputted from the MFP 10, the traveling monitor processing section 1002 waits for the user, who has once left the MFP 10, to again travel the MFP 10.

Receiving the processing instruction sent from the job control processing section 1004, the priority degree control processing section 1003 established the initial priority degree of the job inputted, based on the kind of the job, the processing time, the user's authority (user's authority level), the current job status in the MFP 10, etc. (Step S1004).

When the user has acknowledged the job priority degree changing function (Step S1005: [job priority degree changing function is acknowledged]), the user operates either the terminal device 7 or the operating section 17 of the MFP 10 to conduct operations for changing the priority degree of the job inputted by himself, so as to change the priority degree concerned. When the abovementioned operation is conducted (Step S1006), the priority degree control processing section 1003 is notified of the instruction for changing the priority degree concerned through the network communication section 23 or the operating section 17 of the MFP 10 (Step S1007, Step S1008).

According to the instruction received, the priority degree control processing section 1003 implements the operation for changing the priority degree of the job concerned (Step S1009). When the operation for heightening the priority degree concerned is completed, the possibility that the job concerned will be implemented prior to other jobs is also heightened.

When the user has not acknowledged the job priority degree changing function (Step S1005: [job priority degree changing function is not acknowledged]), there is no possibility that the user conduct the operations for changing the priority degree of the job inputted by himself, so as to change the priority degree concerned.

Operations to be Conducteded at the Time of Implementing the Job (Horizontal Lane 1101)

The priority degree of the job, established in Step S1004, is inputted into the job status confirmation processing (Step S1100). When the priority degree of the job is changed in Step S1009, the changed priority degree is inputted into the job status confirmation processing (Step S1100).

In the job status confirmation processing (Step S1100), the job control processing section 1004 compares the priority degree of the inputted job with those of the other jobs. When determining that a job having a high priority degree is in mid course of its implementation or the standby state (Step S1101;

[job having high priority degree is in mid course of its implementation]), the job control processing section 1004 returns to Step S1100, so as to repeat the operations from Step S1100 to Step S1101 until the job having high priority degree is completed (implementation waiting status of the inputted job). When determining that it is possible to implement the inputted job, since a job, having the priority degree higher than that of the inputted job, does not exist, or has disappeared, (Step S1101; [it is possible to implement inputted job]), the job control processing section 1004 implements the job concerned (Step S1102). When the implementation of the job concerned is completed, the operations (job control processing) to be applied to the job concerned in the MFP 10 are finalized. If a next job still exists, the next job will be successively implemented.

As described in the foregoing, at the time of implementing the job, the job control processing section 1004 conducts such the operations that the inputted job is registered and controlled by using the job queue while correlating the inputted job and the concerned user with each other and the implementation order of inputted jobs is determined on the basis of the priority degrees of them, so as to sequentially implement the inputted jobs one by one according to the above-determined implementation order. Further, when the user conducts operations for heightening the priority degree of the job, the job control processing section 1004 puts forward the implementation of the job concerned.

Operations to be Conducted at the Time When User Travels MFP 10 (Horizontal Lane 1102)

The user who inputted the job (Step S1000) travels the MFP 10 in order to confirm the completion of the job inputted (Step S1200). In the case that, when traveling the MFP 10, the user confirms that the job inputted by the user himself has been already completed (Step S1201; [job is completed]), the user receives print products already outputted by the MFP 10 so far. When the user receives the print products concerned, the operations to be conducted with respect to the concerned job at the time when the user travels the MFP 10 is finalized.

In the case that, when traveling the MFP 10, the user confirms that the job inputted by the user himself has not been completed and is still in the standby state (Step S1201; [job is not completed]), the user would return to his desk or would once leave the MFP 10 to perform another work, etc., and will again travel the MFP 10 so as to confirm whether or not the job concerned is completed (Step S1200). In this way, the user will repeat the operations from Step S1200 to Step S1201, until the job inputted by himself is completed.

When the user travels the MFP 10 (Step S1200), the non-contact type token device possessed by the user enters into the communication enabling area of the token device communication section 24 of the MFP 10. Then, the token device communication section 24 automatically starts the communication with the user's portable token device. Starting the communication, the token device communication section 24 notifies an authentication processing section 1001 of the commencement of the user authentication processing (Step S1202, Step S1203).

Receiving the abovementioned notification (Step S1203), the authentication processing section 1001 stats the user authentication processing, and compares the authenticating information, acquired from the user's portable token device, serving as the other party of the communication, by the token device communication section 24, with the other authenticating information for checking use, stored in advance in the nonvolatile storage 15, so as to determine whether the user authentication processing has resulted in success or failure (Step S1204). In this user authentication processing, the authentication processing section 1001 also monitors that the token device communication section 24 continuously communicates with the user's portable token device concerned, during such a predetermined time period that is necessary for completing the user authentication processing. In case that the communication between them is shut out within the predetermined time period, the authentication processing section 1001 determines that the user simply passes through the area in front of the MFP 10, and suspends the current user authentication processing to wait for the commencement of a next user authentication processing (Step S1203).

In the user authentication processing, when determining that the user authentication processing has resulted in failure (Step S1204; [authentication resulted in failure]), the authentication processing section 1001 finalizes the operations concerned. On the other hand, when determining that the user authentication processing has resulted in success (Step S1204; [authentication resulted in success]), the authentication processing section 1001 further determines whether or not the job, inputted by the authenticated user and currently in the standby state, exists (Step S1205).

When determining that the job concerned does not exist (Step S1205; [absence of job]), the authentication processing section 1001 finalizes the operations concerned. When determining that the job concerned exists (Step S1205; [presence of job]), the authentication processing section 1001 notifies the traveling monitor processing section 1002 of the traveling (authentication) of the user for whom the job currently in the standby state exists (Step S1209).

At the joining node in Step S1209, as the parallel processing, the traveling monitor processing section 1002 waits for the completion of the operation for initializing the traveling counter of the inputted job, and also waits for the notification of the traveling (action for traveling the MFP 10) to be conducted in the authentication processing for the user for whom the job currently in the standby state exists. When the abovementioned two conditions are fulfilled, the traveling monitor processing section 1002 incrementally increases the counted value of the traveling counter of the job corresponding to the user who has traveled the MFP 10 (Step S1206), and compares the counted value of the traveling counter with a predetermined value (threshold value) established in advance (Step S1207).

When the counted value is equal to or smaller than the predetermined value (Step S1207; [counted value≦predetermined value]), the traveling monitor processing section 1002 finalizes the operations concerned. On the other hand, when the counted value exceeds the predetermined value (Step S1207; [counted value>predetermined value]), the traveling monitor processing section 1002 clears (initializes) the traveling counter, and instructs the priority degree control processing section 1003 to heighten the priority degree of the job, corresponding to the user who has traveled the MFP 10 (authenticated user) and currently in the standby state (Step S1208).

Receiving the abovementioned instruction from the traveling monitor processing section 1002, the priority degree control processing section 1003 raises the priority degree of the job, corresponding to the user who has traveled the MFP 10 and currently in the standby state (Step S1210). Further, the priority degree control processing section 1003 notifies a notification processing section 1005 of the fact that the priority degree of the job, corresponding to the user who has traveled the MFP 10 and currently in the standby state, has changed (Step S1211).

Receiving the abovementioned notification sent from the priority degree control processing section 1003, the notification processing section 1005 makes the display section 16 display a message indicating that the priority degree of the job, corresponding to the authenticated user and currently in the standby state, has changed, thereon, and at the same time, makes the sound generating section 18 emit a beeping sound, so as to notify the user of the message (Step S1211). In addition to the above, the notification processing section 1005 creates an E-mail describing that priority degree of the job, inputted by the user concerned and currently in the standby state, has been heightened, and acquires an E-mail address from the nonvolatile storage 15 in order to attach the acquired E-mail address to the address column of the E-mail concerned, and transmits the E-mail through the network communication section 23 (E-mail notification). When completing the notifying operations abovementioned, the notification processing section 1005 finalizes the operations concerned.

In this connection, it is also applicable that the abovementioned mail notification is transmitted through a voice mail system. When employing the voice mail system, it is necessary to register the telephone number of the user's telephone into the MFP 10 (storing it into nonvolatile storage 15), to achieve the voice mail transmission.

According as the user repeats to travel the MFP 10, the operations in Step S1200 through Step S1210 have been also implemented repeatedly. Through this repeated process, the priority degree of the job, inputted by the user concerned and currently in the standby state, is gradually heightened to a level higher than the initial priority degree established in Step S1004. Concretely speaking, when the counted value of the traveling counter becomes higher than the predetermined value, the user has frequently traveled the MFP 10. Then, the priority degree control processing section 1003 determines that the urgency of the print outputting operation based on the job, inputted by the user concerned and currently in the standby state, is high, and changes the priority degree of the concerned job to that higher than those of the other users. When the priority degree of the job, inputted by the user concerned, has been changed to that higher than those of the other users, the job control processing section 1004 determines that the concerned job is implementable, and implements the concerned job (Step S1102).

As described in the foregoing, the MFP 10, embodied in the present invention, conducts the changing operation for heightening the priority degree of the job (print outputting job), currently in the standby state, based on the traveling frequency ((user authenticating times)/(input status of authenticating information)) in regard to the user who inputted the job concerned. As a result, the implementation order of the job, the priority degree of which has been heightened and currently in the standby state, tends to be put forward, or is actually put forward. According to the abovementioned feature of the present invention, by frequently traveling the MFP 10 after inputting the job, it becomes possible for the user to automatically heighten the priority degree of the job, inputted by the user concerned and currently in the standby state, so as to put forward the implementation order of the job concerned, even if the user does not know the priority degree changing function (interrupting function) itself or the its operating method.

Concretely speaking, the advantageous features of the present invention are described item by item in detail as follows.
(1) It becomes possible to preferentially implement the print outputting operation of the job having a high urgency, even if the initial priority degree of the concerned job is low.
(2) It becomes possible for the user to preferentially implement the print outputting operation of the job having a high urgency, even if the concerned user has such a low authority that he cannot change the priority degree of the job by himself.
(3) It becomes possible for the user to easily heighten the priority degree of the job without operating the MFP 10 so as to easily put forward the implementation order of the job concerned, even if the concerned user has not been used to the operations of the MFP 10 or does not know the priority degree changing function.

Further, when the changing operation for heightening the priority degree of the output job, currently in the standby state, has been implemented, the MFP 10 notifies the user of the result of the changing operation so as to make it possible for the user to recognize the result.

Still further, according to the MFP 10, embodied in the present invention, since the traveling counter is updated for every user (for every job of the user), it becomes possible to avoid such the problem, which is liable to occur in the conventional configuration set forth in Tokkai 2005-125661 as aforementioned, that the priority degrees of the large number of standby print jobs are heightened at a time, and as a result, there has been a possibility that it would take a considerable time to start an implementation of another print job inputted after that. On the other hand, the system, set forth in Tokkai 2005-244656 as aforementioned, employs the near-distance communication technology for automatically authenticating the user who traveled the MFP concerned, and then, the priority degree of the above-authenticated user is compared with that of the other user who has already inputted the concerned job, so as to determine whether the print job of the above-authenticated user or that of the other user should override the other. According to this technology set forth in Tokkai 2005-244656, in such a case that a large number of print jobs, inputted by the users whose priority degrees are higher than that of the above-authenticated user, are in the standby status, there has been a possibility that it would take a considerable time to start an implementation of the print job inputted by the above-authenticated user having the low priority degree. However, according to the MFP 10 embodied in the present invention, it becomes possible for even such the user that has the low priority degree, to put forward the implementation order of the job, inputted by the user concerned and currently in the standby state, by heightening the frequency of traveling the MFP 10 so as to heighten the urgency of the job concerned.

Second Embodiment

In the foregoing, the exemplified configuration in which the priority degree of the job is made to change on the basis of the user's frequency of traveling the MFP 10 has been detailed as the first embodiment. Next, another exemplified configuration, in which the priority degree of the job is made to change on the basis of a traveling time, will be detailed in the following. Hereinafter in the present embodiment, the traveling time is defined as an accumulated time interval the user traveled the MFP 10.

The MFP 10, embodied in the present invention as the second embodiment, is provided with a traveling timer of the job, instead of the traveling counter of the job employed in the first embodiment. The other structural elements are the same as those of the first embodiment.

The traveling timer of the job serves as such a timer that is provided for measuring the accumulated time interval of the user's stay at the MFP 10 every time when the user travels the MFP 10 while the job, inputted by the user concerned and currently in the standby state, still exists. As well as the traveling counter employed in the first embodiment, the traveling timer is stored in the nonvolatile storage 15 and provided in a unit of job. In this connection, it is also applicable that the traveling timer is provided in a unit of user. For instance, when the user has inputted plural jobs and the inputted plural jobs are currently in the standby state, an individual traveling timer is provided for every job if the mode in a unit of job is established, while a traveling timer common to the inputted plural jobs is provided for every user if the mode in a unit of user is established.

Figures 4, 4A:
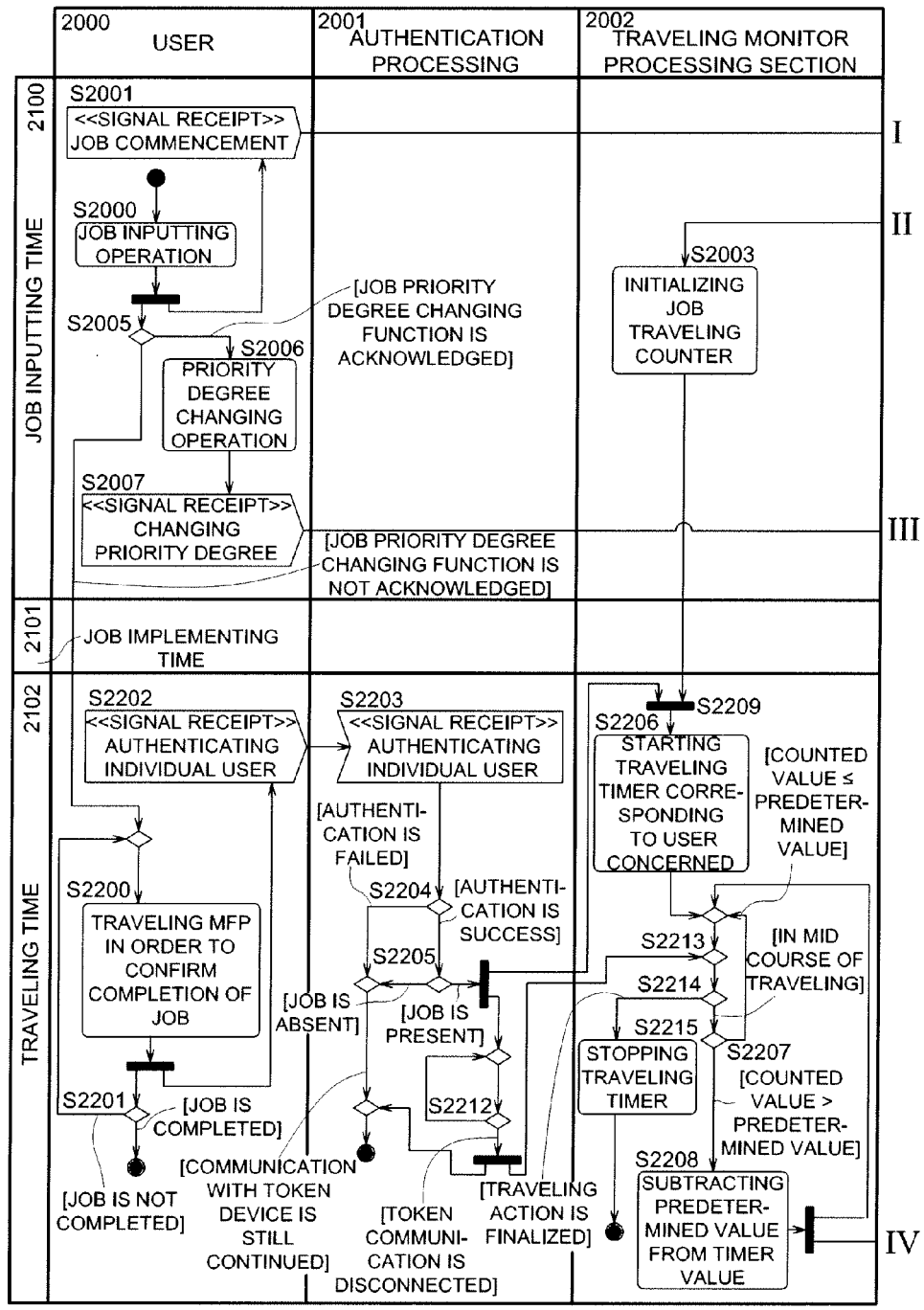
FIG. 4 shows an activity chart indicating operations to be conducted in a Multi Function Peripheral, serving as an image processing apparatus embodied in the present invention as the second embodiment.
Figure 4B:
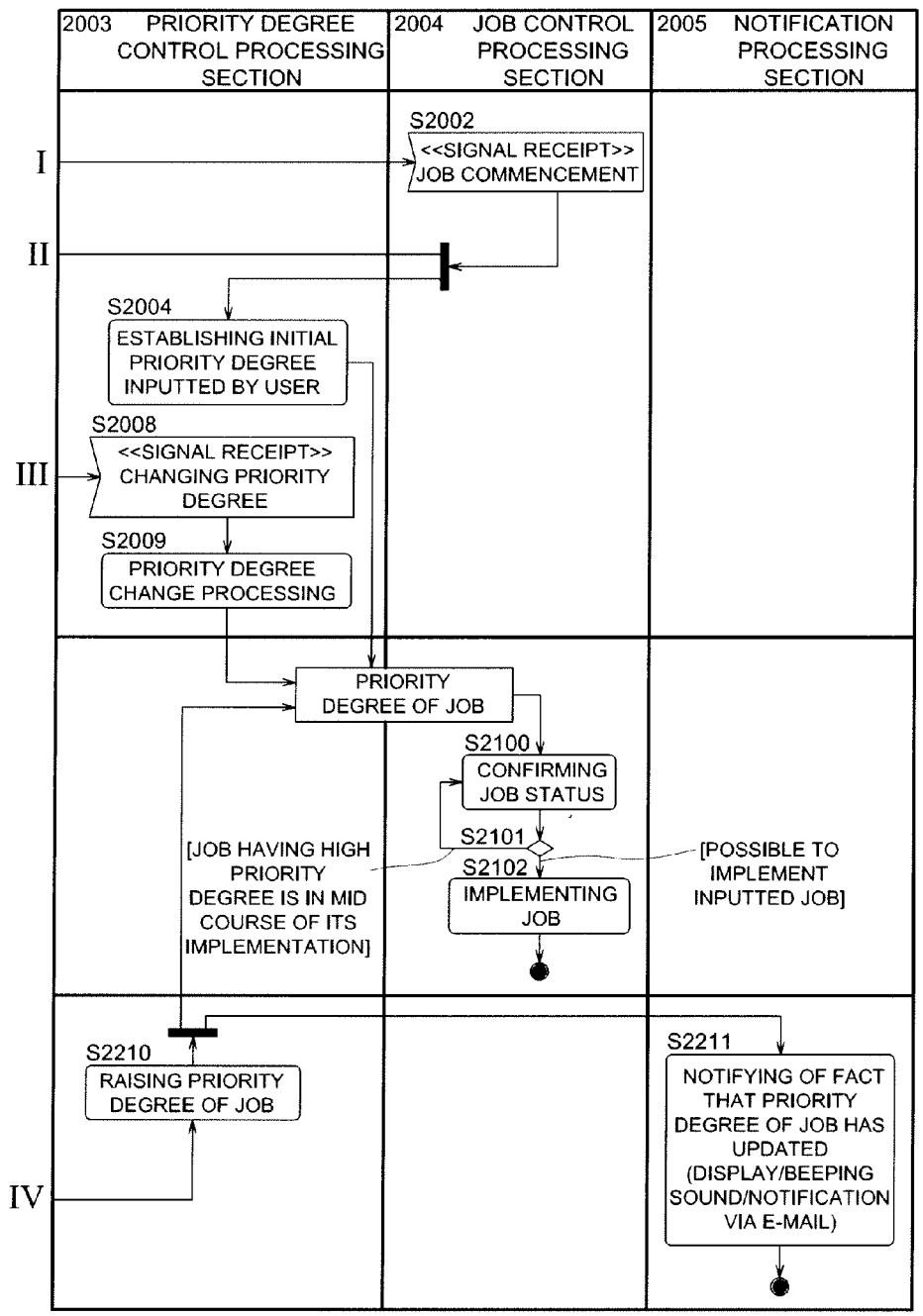

FIG. 4 shows an activity chart indicating the operations to be conducted in the MFP 10 embodied in the present invention as the second embodiment. The way of viewing the activity chart shown in FIG. 4 is the same as that shown in FIG. 3. As shown in FIG. 4, the contents of the processing to be conducted in each of the processing sections by either the user or the controlling section (CPU 11) of the MFP 10 are indicated in each of the vertical lanes, extended in a direction of the vertical axis and divided in a direction of the horizontal axis. The processing items in a vertical lane 2000 represent the operations to be conducted by the user, the processing items in a vertical lane 2001 represent the authenticate processing to be conducted by the MFP 10, the processing items in a vertical lane 2002 represent the user's traveling monitor processing to be conducted by the MFP 10, the processing items in a vertical lane 2003 represent the priority degree control processing to be conducted by the MFP 10, the processing items in a vertical lane 2004 represent the job control processing to be conducted by the MFP 10, and the processing items in a vertical lane 2005 represent the contents of notification processing to be conducted by the MFP 10. Each of the statuses of the user and the MFP 10, associating with the passage of time, is represented in each of the horizontal lanes, extended in a direction of the horizontal axis and divided in a direction of the vertical axis. The processing items in a horizontal lane 2100 represent the processing (operations) to be conducted at the time of initially inputting the job, the processing items in a horizontal lane 2101 represent the processing (operations) to be conducted at the time of implementing the job, and the processing items in a horizontal lane 2102 represent the processing (operations) to be conducted at the time when the user travels the MFP 10.

Comparing the second embodiment shown in FIG. 4 with the first embodiment shown in FIG. 3, the processing item to be conducted by the traveling monitor processing section 2002 at the time when the job is initially inputted (Step S2003), the processing items to be conducted by authentication processing section 2001 and the processing items to be conducted by the traveling monitor processing section 2002 are different from those in the first embodiment, while the other processing items in the second embodiment are the same as those in the first embodiment. Accordingly, only the points being different from those in the first embodiment will be detailed in the following.

Traveling Monitor Processing to be Conducted at the Time of Initially Inputting the Job (Horizontal Lane 2100 and Vertical Lane 2002)

Receiving the processing instruction sent from the job control processing section 2004, the traveling monitor processing section 2002 initializes the traveling timer registered in advance (Step S2003), and waits for the user traveling the MFP 10 (Step S2209).

Authentication Processing to be Conducted at the Time of Traveling (Horizontal Lane 2102 and Vertical Lane 2001)

The authentication processing section 2001 conducts the processing in Steps S2203 through S2205 in the same way as those in the first embodiment. When determining that the job, inputted by the authenticated user and currently in the standby state, does not exist (Step S2205; [absence of job]), the authentication processing section 2001 finalizes the operations concerned. When determining that the job concerned exists (Step S2205; [presence of job]), the authentication processing section 2001 notifies the traveling monitor processing section 2002 of the traveling (authentication) of the user for whom the job currently in the standby state exists (Step S2209). Further, the authentication processing section 2001 keeps the periodical communications with the token device through the token device communication section 24 without finalizing the communication with the token device, to confirm the validity of the connection with the token device by using "Keep Alive mode", etc., so as to try to retain the communication path with the token device concerned, and determines whether or not the communication with the token device is still continued (Step S2212; [communication with token device is still continued]).

When the communication between the token device communication section 24 and the token device is disconnected (Step S2212; [token communication is disconnected]), determining that the concerned user has left the MFP 10, the authentication processing section 2001 notifies the traveling monitor processing section 2002 of the finalization of the traveling action conducted by the user for whom the job currently in the standby state still exists (authentication release) (Step S2213), and then, finalizes the operation (authentication processing).

Traveling Monitor Processing to be Conducted at the Time of Traveling (Horizontal Lane 2102 and Vertical Lane 2002)

At the joining node in Step S2209, as the parallel processing, the traveling monitor processing section 2002 waits for the completion of the operation for initializing the traveling timer of the inputted job, and also waits for the notification of the traveling (action for traveling the MFP 10) to be conducted in the authentication processing for the user for whom the job currently in the standby state still exists. When the abovementioned two conditions are fulfilled, the traveling monitor processing section 2002 starts the traveling timer corresponding to the user who has traveled the MFP 10 (Step S2206), and compares the counted value of the traveling counter with a predetermined value (threshold value) established in advance (Step S2207), while monitoring the notification of the finalization of the traveling action conducted by the user concerned (Step S2213), which is to be sent from the authentication processing section 2001.

When the timer value is equal to or smaller than the predetermined value (Step S2207; [timer value≦predetermined value]), the traveling monitor processing section 2002 makes the traveling timer continue to measure the time. On the other hand, when the timer value exceeds the predetermined value (Step S1207; [counted value>predetermined value]), the traveling monitor processing section 2002 subtracts the predetermined value from the timer value currently indicated by the traveling timer so as to update the traveling timer, and then, makes the traveling timer continue to measure the time, and at the same time, instructs the priority degree control processing section 2003 to raise the priority degree of the job, which is currently in the standby state and corresponding to the user (authenticated user) who has traveled the MFP 10 (Step S2208)

Further, receiving the notification of the finalization of the traveling action conducted by the concerned user during the time measuring operation conducted by the traveling timer (Step S2214; [traveling action is finalized]), the traveling monitor processing section 2002 stops the traveling timer (Step S2215), and finalizes the operation.

When the user travels the MFP 10 and stays there for a long time (traveling timer value>predetermined value), the processing in Step S2200 through Step S2200 (including processing in Step S2212, Step S2213, Step S2207 and Step S2208) are implemented. Further, in the second traveling action or later, the timer value measured for the current traveling action is added to the previous timer value indicated at the time when the previous traveling action has been finalized, so as to indicate the accumulated timer value. Through this repeated process, the priority degree of the job, inputted by the user concerned and currently in the standby state, is gradually heightened to a rank higher than the initial priority degree established in Step S2004.

Concretely speaking, when the timer value of the traveling counter becomes greater than the predetermined value, the user has traveled the MFP 10 and stays there for a long time. Then, the priority degree control processing section 2003 determines that the urgency of the print outputting operation based on the job, inputted by the user concerned and currently in the standby state, is high, and changes the priority degree of the concerned job to that higher than those of the other users. When the priority degree of the job, inputted by the user concerned, has been changed to that higher than those of the other users, the job control processing section 2004 determines in Step S2101 that the concerned job is implementable, and implements the concerned job (Step S2102).

As described in the foregoing, the MFP 10, embodied in the present invention, conducts the changing operation for heightening the priority degree of the job (print outputting job), which is currently in the standby state, based on the traveling time ((user authentication time)/(input status of authenticating information)) in regard to the user who inputted the job concerned. According to the abovementioned feature of the present invention, by traveling the MFP 10 and staying there for a long time after inputting the job, it becomes possible for the user to automatically heighten the priority degree of the job, inputted by the user concerned and currently in the standby state, so as to put forward the implementation order of the job concerned, even if the user does not know the priority degree changing function (interrupting function) itself or the its operating method.

Third Embodiment

Next, a modified example, in which the priority degree of the job is to be changed on the basis of the number of traveling times (traveling frequency) described in the first embodiment and the traveling time described in the second embodiment, will be detailed in the following as the third embodiment of the present invention. Concretely speaking, by employing a combination of the traveling frequency and the traveling time, the number of traveling times is counted in the same way as that in the first embodiment, and at the same time, the counted value of the traveling counter is further counted up when a traveling time (continuous staying time) for a single traveling action of the user exceeds a predetermined value, so as to repeat the abovementioned counting up operation for every time when the traveling time concerned exceeds the predetermined value.

In the third embodiment, the traveling counter described in the first embodiment is employed for both the counting and the counting up operations abovementioned. Further, the traveling time is defined as a continuous staying time for a single traveling action of the user, instead of the accumulated traveling time described in the second embodiment, and the system is so constituted that the authentication processing section measures the traveling time. Still further, The configuration of the MFP 10, embodied in the present invention as the third embodiment, is the same as that described in the first embodiment, except a controlling program.

Figure 5A:
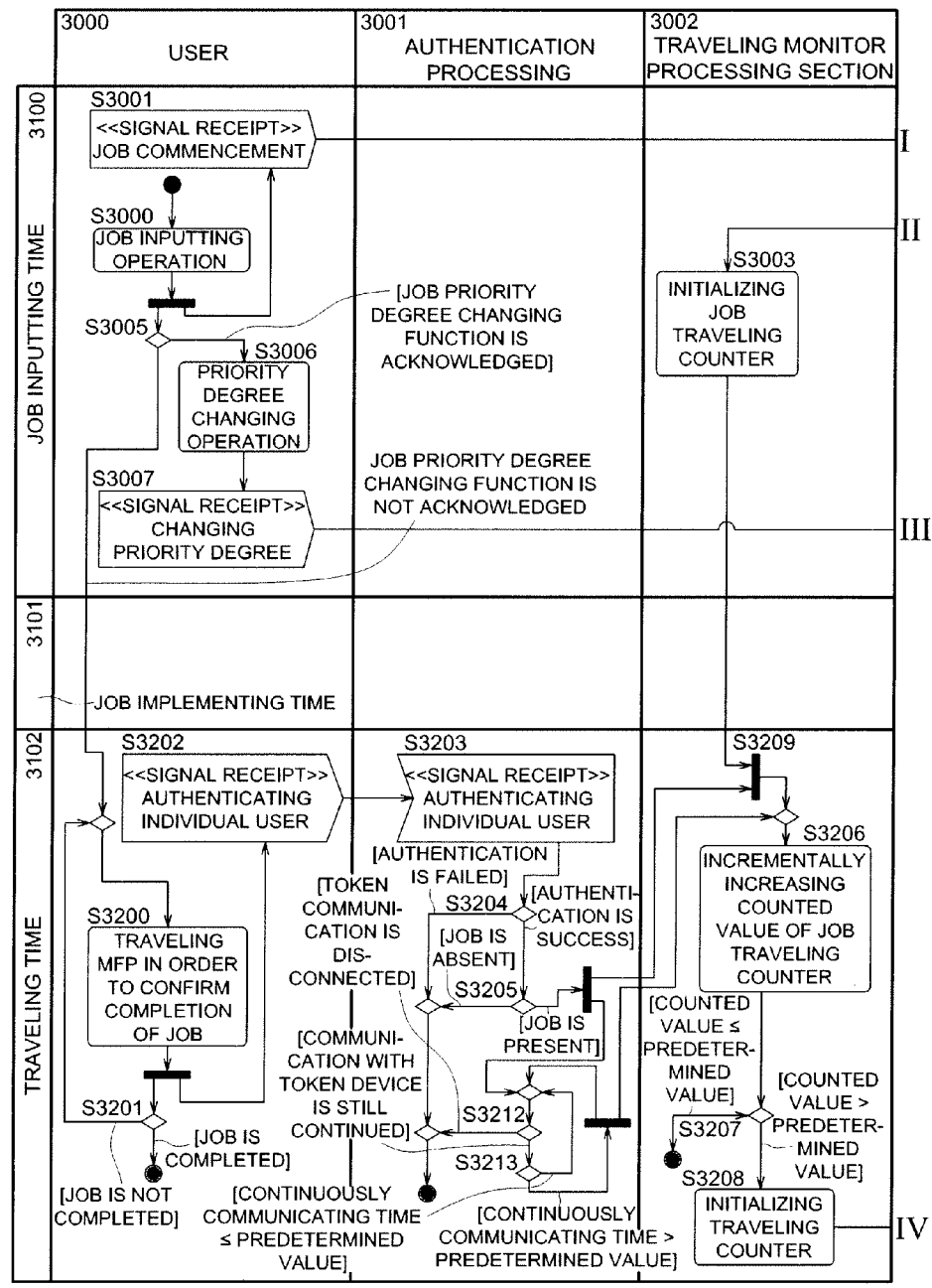
FIG. 5 shows an activity chart indicating operations to be conducted in a Multi Function Peripheral, serving as an image processing apparatus embodied in the present invention as the third embodiment.
Figure 5B:
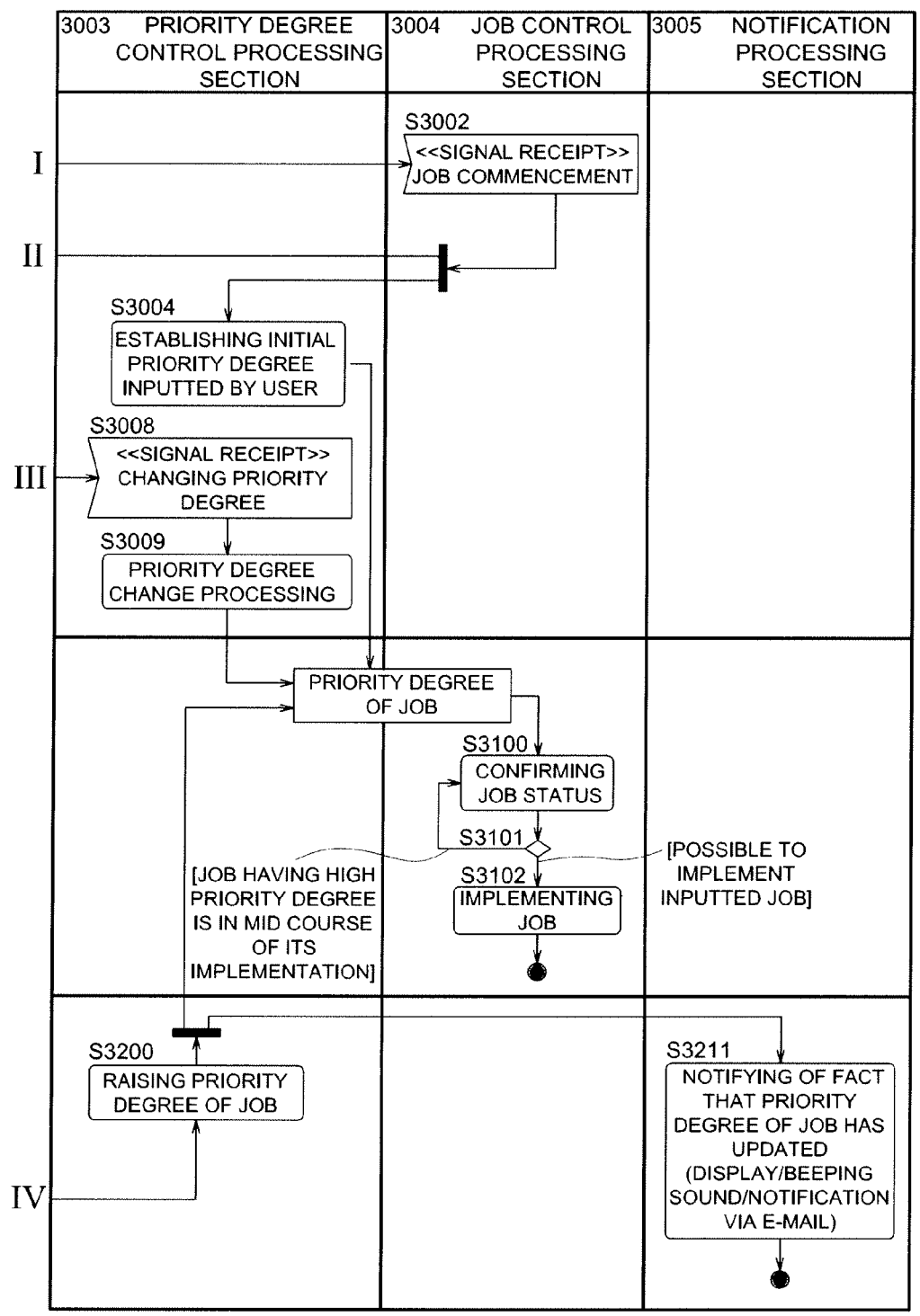

FIG. 5 shows an activity chart indicating the operations to be conducted in the MFP 10 embodied in the present invention as the third embodiment. The way of viewing the activity chart shown in FIG. 5 is the same as that shown in FIG. 3. As shown in FIG. 5, the contents of the processing to be conducted in each of the processing sections by either the user or the controlling section (CPU 11) of the MFP 10 are indicated in each of the vertical lanes, extended in a direction of the vertical axis and divided in a direction of the horizontal axis. The processing items in a vertical lane 3000 represent the operations to be conducted by the user, the processing items in a vertical lane 3001 represent the authenticate processing to be conducted by the MFP 10, the processing items in a vertical lane 3002 represent the user's traveling monitor processing to be conducted by the MFP 10, the processing items in a vertical lane 3003 represent the priority degree control processing to be conducted by the MFP 10, the processing items in a vertical lane 3004 represent the job control processing to be conducted by the MFP 10, and the processing items in a vertical lane 3005 represent the contents of notification processing to be conducted by the MFP 10. Each of the statuses of the user and the MFP 10, associating with the passage of time, is represented in each of the horizontal lanes, extended in a direction of the horizontal axis and divided in a direction of the vertical axis. The processing items in a horizontal lane 3100 represent the processing (operations) to be conducted at the time of initially inputting the job, the processing items in a horizontal lane 3101 represent the processing (operations) to be conducted at the time of implementing the job, and the processing items in a horizontal lane 3102 represent the processing (operations) to be conducted at the time when the user travels the MFP 10.

Comparing the third embodiment shown in FIG. 4 with the first embodiment shown in FIG. 3, the processing items to be conducted by authentication processing section 3001 and the processing items to be conducted by the traveling monitor processing section 3002 are different from those in the first embodiment, while the other processing items in the third embodiment are the same as those in the first embodiment. Accordingly, only the points being different from those in the first embodiment will be detailed in the following.
Authentication Processing and Traveling Monitor Processing to be Conducted at the Time of Traveling (Horizontal Lane 3102 and Vertical Lane 3001 & Horizontal Lane 3102 and Vertical Lane 3002)

The authentication processing section 3001 conducts the processing in Steps S3203 through S3205 in the same way as those in the first embodiment. When determining that the job, inputted by the authenticated user and currently in the standby state, does not exist (Step S3205; [absence of job]), the authentication processing section 3001 finalizes the operations concerned. When determining that the job concerned exists (Step S3205; [presence of job]), the authentication processing section 3001 notifies the traveling monitor processing section 3002 of the traveling (authentication) of the user for whom the job currently in the standby state exists (Step S3209). Receiving the abovementioned notification sent from the authentication processing section 3001, the traveling monitor processing section 3002 incrementally increases the counted value of the traveling counter of the job corresponding to the user who has traveled the MFP 10 (Step S3206).

Further, as well as in the second embodiment, the authentication processing section 3001 keeps the periodical communications with the token device through the token device communication section 24 without finalizing the communication with the token device, to confirm the validity of the connection with the token device by using "Keep Alive mode", etc., so as to try to retain the communication path with the token device concerned, and determines whether or not the communication with the token device is still continued (Step S3212).

When the communication between the token device communication section 24 and the token device is disconnected (Step S3212; [token communication is disconnected]), determining that the concerned user has left the MFP 10, the authentication processing section 3001 finalizes the operations concerned (authentication processing). When determining that the communication between the token device communication section 24 and the token device is still continued (Step S3212; [communication is continued]), the authentication processing section 3001 compares the continuously communicating time with the predetermined value (threshold value) established in advance (Step S3213).

When determining that the continuously communicating time with the user's portable token device concerned is equal to or smaller than the predetermined value (Step S3213; [continuously communicating time≦predetermined value]), the authentication processing section 3001 returns to Step S3212, to confirm the current status of the communication with the token device. When determining that the continuously communicating time concerned is longer than the predetermined value (Step S3213; [continuously communicating time>predetermined value]), the user would still stay at the area located in front of the MFP 10, and accordingly, it can be determined that the urgency of the print outputting operation based on the job, inputted by the user concerned and currently in the standby state, is still further high. In that case, the authentication processing section 3001 notifies the traveling monitor processing section 3002 of an instruction for incrementally increasing the counted value of the traveling counter. Receiving the above-notified instruction, the traveling monitor processing section 3002 further incrementally increases the counted value of the traveling counter corresponding to the user who currently travels the MFP 10.

The authentication processing section 3001 continues to measure the continuously communicating time with the user's portable token device, until determining that the communication is disconnected. The operation for notifying the traveling monitor processing section 3002 of the instruction for counting up the counted value of the traveling counter (additional incremental increase) is conducted at every time when the continuously communicating time with the user's portable token device exceeds the predetermined time interval.

As described in the foregoing, the MFP 10, embodied in the present invention as the third embodiment, conducts the changing operation for heightening the priority degree of the job (print outputting job), which is currently in the standby state, based on the traveling times (traveling frequency) and the traveling time ((user authentication frequency and time)/(input status of authenticating information)) in regard to the user who inputted the job concerned. According to the above-mentioned feature of the present invention, by frequently traveling the MFP 10 and/or staying there for a long time after inputting the job, it becomes possible for the user to automatically heighten the priority degree of the job, inputted by the user concerned and currently in the standby state, so as to put forward the implementation order of the job concerned, even if the user does not know the priority degree changing function (interrupting function) itself or the its operating method.

Referring to the drawings, the embodiments of the present invention have been described in the foregoing. However, the scope of the present invention is not limited to the above-described embodiments. Any kinds of modifications and additions made by a skilled person without departing from the spirit and scope of the invention shall be included in the scope of the present invention.

Although the above-described embodiments are so constituted that the authenticating information and the job information are stored into the nonvolatile storage to conduct the operations for managing them, it is also applicable that the system is so constituted that the operations for managing them are conducted through the network communication section by utilizing the various kinds of external apparatuses, such as a server, a personal computer, etc.

The Multi Function Peripheral, embodied in the present invention, is so constituted that the user who inputted the job is identified by conducting the user authenticating operation associated with the operation for inputting the authenticating information, it is also applicable that the MFP is so constituted that the concerned user is identified only by inputting the authenticating information, without conducting the user authenticating operation. In this case, the operation for inputting the authenticating information can be conducted by employing the token device or the like, as described in the "DETAILED DESCRIPTION OF THE PREFERRED EMBODIMENT".

With respect to the operations of the MFP, although the non-contact type token device has been exemplified as the token device to be used for the user identifying operation (user authenticating operation) in the present embodiments, a contact type token device may be also applicable for this purpose. Alternatively, it is also applicable that the system is so constituted that the user inputs a password and/or his biological information so as to achieve the user identifying operation (user authenticating operation).

Although, in the above-described embodiments of the present invention, there has been exemplified such the job that conducts various kinds of the print outputting operations, such as the printing operation instructed from the terminal device, the copy operation instructed from the operating section of the MFP, etc., it is also applicable that a job for conducting a facsimile transmitting operation for outputting image data is made to be an object of the present invention.

Although, in the aforementioned processing (authentication processing/traveling monitor processing/priority degree control processing), the counted value of the traveling counter is incrementally increased by regarding the traveling action conducted by the user as the base point, it is also applicable that the MFP is so constituted that the job interrupting function and the job jumping function provided in the MFP are also activated in parallel, so as to incrementally increase the counted value of the traveling counter by regarding the fact that the concerned job is interrupted, as the base point. In this case, according as the number of interrupted times increases in addition to the number of traveling times, the effect that the implementation order of the concerned job is put forward can be obtained.

In the descriptions of the present embodiment, either the accumulated time or the continuous time (continuous time per one traveling action of the user) has been exemplified as the traveling time when the user travels the MFP. However, it is also applicable that a time interval between a traveling action and a next traveling action (time interval between operations for inputting user identification information) is employed for the abovementioned purpose. When either the accumulated time or the continuous time is employed, it can be determined that the longer the time (measured time) is, the higher the urgency of the job, currently in the standby state, becomes. On the other hand, when the time interval between the traveling actions is employed, it can be determined that the shorter the time interval is, the higher the urgency of the job, currently in the standby state, becomes. When the time interval between the traveling actions is employed, it is applicable that the processing, such as a processing for raising the priority degree of the outputting job, etc., is to be conducted when the time interval concerned is smaller than the predetermined value (predetermined time) established in advance.

Although there has been described such the example that the status of the user's operation for inputting identification information (authenticating information) is recognized by monitoring the user's traveling actions to the MFP, namely, based on the number of times for inputting the user's identification information to be inputted by the user concerned (number of traveling times) and the time consumed for the user's inputting operation (traveling time), it is also applicable that the status of the user's operations is recognized by monitoring the user's operations for accessing to the MFP from the terminal device. In this case, it is applicable that the system is so constituted that the user can access to the MFP from the terminal device so as to confirm the progress status of the outputting job concerned, and at the time of accessing the MFP, the user identification information is inputted into the MFP from the terminal device, or the like. According to the abovementioned configuration, it becomes possible to recognize the status of the user's operation for inputting identification information by monitoring the user's actions for accessing to the MFP, namely, based on the number of inputting times of the user's identification information to be inputted (received) from the terminal device currently accessing to the MFP (number of receiving times/number of accessing times) and the time consumed for the user's inputting operation (receiving time/accessing time).

Further, with respect to the establishment (change) of the priority degree of the outputting job, although there has been described such the example that the initial priority degree, automatically established in advance by the MFP, can be changed after the concerned outputting job is inputted, it is also applicable that the system is so constituted that, at the time when the concerned outputting job is inputted, the priority degree can be established by the user's operation. For instance, it is applicable that the system is so constituted that, with respect to the print job or the like instructed from the terminal device, the priority degree can be established by executing the driver program installed in the terminal device concerned, while, with respect to the job, such as a copy job, a facsimile job, etc., to be instructed in the MFP, the priority degree can be established by operations conducted for the MFP.

Still further, with respect to the operation for notifying the fact that the priority degree of the outputting job has been updated, although there has been described such the example that the notifying operation is conducted by using the display, the sound (beeping sound) and the notification to be sent to the terminal device via E-mail, it is also applicable that the notification is conducted by any one or any two of the abovementioned methods. With respect to the notifying operation using the sound, it is applicable that voice sounds representing the updated contents are emitted. Further, it is also applicable that the notifying operation is conducted at the time when the implementation order of the concerned job has been put forward. Even in this case, it is also applicable that at least one of the abovementioned methods, including the display, the sound (beeping sound, voice sound, etc.) and the notification to be sent to the terminal device via E-mail, is employed for the notifying operation concerned.

Still further, although the configuration in which the implementation order of the plurality of outputting jobs inputted is controlled on the basis of the priority degrees of the outputting jobs concerned, namely, such the configuration that the outputting job having a high priority degree is preferentially implemented, has been exemplified in the aforementioned embodiments of the present invention, it is also applicable that the system is so constituted that the implementation order of the plurality of outputting jobs is controlled without taking the priority degrees of them into account. In this connection, for instance, in such the case that the implementation order of the plurality of outputting jobs is controlled in such a manner that the outputting job currently inputted is registered at a trailing end of the job implementation queue, and sequentially implements the outputting jobs in order of the job implementation queue, the leading top first, it is also applicable that the system is so constituted that, based on the status of inputting the user's identification information (user traveling status, etc.), the rank of the outputting job concerned is heightened within the job implementation queue, namely, the implementation order of the outputting job concerned is put forward.

Yet further, the present invention is available not only for a Multi Function Peripheral, the examples of which have been aforementioned as the embodiments of the present invention, but also for other various kinds of image processing apparatuses, such as a copier, a printer, a facsimile apparatus, etc.

According to an image processing apparatus embodied in the present invention, it becomes possible to put an implementation order of an image outputting job, inputted by a user and currently in the standby state, forward, even if the concerned user does not conduct specific operations.

While the preferred embodiments of the present invention have been described using specific term, such description is for illustrative purpose only, and it is to be understood that changes and variations may be made without departing from the spirit and scope of the appended claims.

What is claimed is:

1. An image processing apparatus, comprising:
   a job inputting section to input an outputting job based on which an image is to be outputted, therefrom, while correlating user identification information of a user, who instruct an operation for implementing the outputting job, and the outputting job with each other;
   a job implementation order controlling section to control an implementation order of outputting jobs, each of which is the outputting job inputted from the job inputting section, based on priority degrees of the outputting jobs;
   a job implementing section to sequentially implement the outputting jobs one by one, according to the implementation order of the outputting jobs;
   a user-identification information inputting section to input the user identification information, therefrom; and
   a control section to conduct an updating operation for heightening a priority degree of a specific outputting job, which is currently in a standby state for waiting its turn to be commenced by the job implementing section, based on an inputting status of the user identification information inputted from the user-identification information inputting section and correlated with the specific outputting job,
   wherein the inputting status represents at least one of a number of times the user identification information have been inputted from the user-identification information inputting section, and a time period, during which the user identification information has been inputted at the user-identification information inputting section, and wherein the inputting status represents, at least, the number of times the user identification information have been inputted from the user-identification information inputting section, and wherein, when the number of times the user identification information have been inputted from the user-identification information inputting section exceeds a predetermined threshold value, the control section conducts the updating operation for heightening the priority degree of the specific outputting job, which is currently in the standby state for waiting its turn.

2. The image processing apparatus of claim 1, wherein the user-identification information inputting section includes a connecting section, which is coupled to a storage device into which the user identification information is stored, and through which the user identification information is inputted.

3. The image processing apparatus of claim 1, wherein the user-identification information inputting section includes a receiving section, which communicates with a terminal device that transmits the user identification information, so that the user identification information is inputted through the receiving section.

4. The image processing apparatus of claim 1, wherein the inputting status represents, at least, the time period during which the user identification information has been inputted at the user-identification information inputting section, and wherein, when the time period, during which the user identification information has been inputted at the user-identification information inputting section, exceeds a predetermined threshold value, the control section conducts the updating operation for heightening the priority degree of the specific outputting job, which is currently in the standby state for waiting its turn.

5. The image processing apparatus of claim 1, wherein, when completing the updating operation for heightening the priority degree of the specific outputting job, which is currently in the standby state for waiting its turn, the control section conducts an operation for notifying the user of a message indicating that the updating operation has been completed.

6. The image processing apparatus of claim 5, further comprising:

a display section;

wherein the control section makes the display section display the message thereon.

7. The image processing apparatus of claim 5, further comprising:

a sound generating section;

wherein the control section makes the sound generating section emit audible sound representing the message therefrom.

8. The image processing apparatus of claim 5, further comprising:

a communication section to communicate with a terminal device of the user who has inputted the outputting job;

wherein the control section makes the communication section transmit the message to the terminal device.

9. An image processing apparatus, comprising:

a job inputting section to input an outputting job based on which an image is to be outputted, therefrom, while correlating user identification information of a user, who instruct an operation for implementing the outputting job, and the outputting job with each other;

a job implementation order controlling section to control an implementation order of outputting jobs, each of which is the outputting job inputted from the job inputting section;

a job implementing section to sequentially implement the outputting jobs one by one, according to the implementation order of the outputting jobs;

a user-identification information inputting section to input the user identification information, therefrom; and a control section to conduct an updating operation for putting forward a turn for implementing a specific outputting job, which is currently in a standby state for waiting its turn to be commenced by the job implementing section, in the implementation order of the outputting jobs, based on an inputting status of the user identification information inputted from the user-identification information inputting section and correlated with the specific outputting job, wherein the inputting status represents at least one of a number of times the user identification information have been inputted from the user-identification information inputting section, and a time period, during which the user identification information has been inputted at the user-identification information inputting section, and wherein the inputting status represents, at least, the number of times the user identification information have been inputted from the user-identification information inputting section, and wherein, when the number of times the user identification information have been rutted from the user-identification information inputting section exceeds a predetermined threshold value, the control section conducts the updating operation for putting forward the turn for implementing the specific outputting job, which is currently in the standby state for waiting its turn.

10. The image processing apparatus of claim 9, wherein the user-identification information inputting section includes a connecting section, which is coupled to a storage device into which the user identification information is stored, and through which the user identification information is inputted.

11. The image processing apparatus of claim 9, wherein the user-identification information inputting section includes a receiving section, which communicates with a terminal device that transmits the user identification information, so that the user identification information is inputted through the receiving section.

12. The image processing apparatus of claim 9, wherein the inputting status represents, at least, the time period, during which the user identification information has been inputted at the user-identification information inputting section, and wherein, when the time period, during which the user identification information has been inputted at the user-identification information inputting section, exceeds a predetermined threshold value, the control section conducts the updating operation for putting forward the turn for implementing the specific outputting job, which is currently in the standby state for waiting its turn.

13. The image processing apparatus of claim 9, wherein, when completing the updating operation for putting forward the turn for implementing the specific outputting job, which is currently in the standby state for waiting its turn, the control section conducts an operation for notifying the user of a message indicating that the updating operation has been completed.

14. The image processing apparatus of claim 13, further comprising:
a display section;
wherein the control section makes the display section display the message thereon.

15. The image processing apparatus of claim 13, further comprising:
a sound generating section;
wherein the control section makes the sound generating section emit audible sound representing the message therefrom.

16. The image processing apparatus of claim 13, further comprising:
a communication section to communicate with a terminal device of the user who has inputted the outputting job;
wherein the control section makes the communication section transmit the message to the terminal device.

17. An image processing apparatus, comprising:
a job inputting section to input an outputting job based on which an image is to be outputted, therefrom, while correlating user identification information of a user, who instruct an operation for implementing the outputting job, and the outputting job with each other;
a job implementation order controlling section to control an implementation order of outputting jobs, each of which is the outputting job inputted from the job inputting section, based on priority degrees of the outputting jobs;
a job implementing section to sequentially implement the outputting jobs one by one, according to the implementation order of the outputting jobs;
a user-identification information inputting section to input the user identification information, therefrom; and
a control section to conduct an updating operation for heightening a priority degree of a specific outputting job, which is currently in a standby state for waiting its turn to be commenced by the job implementing section, based on an inputting status of the user identification information inputted from the user-identification information inputting section and correlated with the specific outputting job,
wherein the inputting status represents at least one of a number of times the user identification information have been inputted from the user-identification information inputting section, and a time period, during which the user identification information has been inputted at the user-identification information inputting section, and
wherein the inputting status represents, at least, the time period during which the user identification information has been inputted at the user-identification information inputting section, and wherein, when the time period, during which the user identification information inputted by the user has been kept within the user-identification information inputting section, exceeds a predetermined threshold value, the control section conducts the updating operation for heightening the priority degree of the specific outputting job in regard to the user corresponding to the user-identification information concerned.

18. An image processing apparatus, comprising:
a job inputting section to input an outputting job based on which an image is to be outputted, therefrom, while correlating user identification information of a user, who instruct an operation for implementing the outputting job, and the outputting job with each other;
a job implementation order controlling section to control an implementation order of outputting jobs, each of which is the outputting job inputted from the job inputting section, based on priority degrees of the outputting jobs;
a job implementing section to sequentially implement the outputting jobs one by one, according to the implementation order of the outputting jobs;
a user-identification information inputting section to input the user identification information, therefrom; and
a control section to conduct an updating operation for putting forward a turn for implementing a specific outputting job, which is currently in a standby state for waiting its turn to be commenced by the job implementing section, in the implementation order of the outputting jobs, based on an inputting status of the user identification information inputted from the user-identification information inputting section and correlated with the specific outputting job,
wherein the inputting status represents at least one of a number of times the user identification information have been inputted from the user-identification information inputting section, and a time period, during which the user identification information has been inputted at the user-identification information inputting section, and
wherein the inputting status represents, at least, the number of times the user identification information have been inputted from the user-identification information inputting section, and
wherein, when the number of times the user identification information have been inputted from the user-identification information inputting section exceeds a predetermined threshold value, the control section conducts the updating operation for putting forward the turn for implementing the specific outputting job in regard to the user corresponding to the user-identification information concerned.

* * * * *